United States Patent [19]
Klar et al.

[11] 3,904,881
[45] Sept. 9, 1975

[54] NEUTRON DETECTOR

[75] Inventors: Erich Klar; Pierre Haller; Ernst Georg Runge, all of Erlangen, Germany

[73] Assignee: Siemens Aktiengesellschaft, Munich, Germany

[22] Filed: Aug. 7, 1973

[21] Appl. No.: 386,439

[30] Foreign Application Priority Data
Aug. 9, 1972 Germany............................ 2239226

[52] U.S. Cl. ............................................... 250/390
[51] Int. Cl. .......................................... G01t 3/00
[58] Field of Search..................... 250/390, 391, 392

[56] References Cited
UNITED STATES PATENTS
3,390,270   6/1968   Treinen et al. ...................... 250/390
3,400,289   9/1968   Anderson........................ 250/390 X
3,787,697   1/1974   Shields................................ 250/390

*Primary Examiner*—Archie R. Borchelt
*Attorney, Agent, or Firm*—Kenyon & Kenyon Reilly Carr & Chapin

[57] ABSTRACT

A self-powered neutron detector for use in the presence of gamma radiation and of the type including a collector, with electrical insulating material separating the collector from an emitter which is not only sensitive to neutron flux but also to gamma radiation so that the electrical output of the detector represents not only a value of the neutron flux as desired, but also of the gamma radiation. To reduce or eliminate this undesirable effect of the gamma radiation, the emitter is made to include an added material having a gamma sensitivity differing from that of the first mentioned material to thereby provide a compensation reducing or eliminating the output of the detector due to the gamma radiation.

10 Claims, 6 Drawing Figures

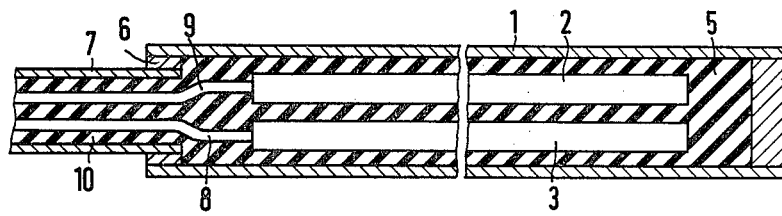 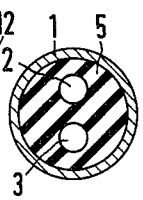
Fig.1  Fig.1a
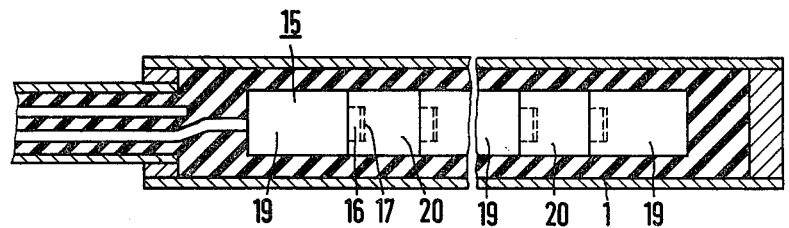
Fig.2
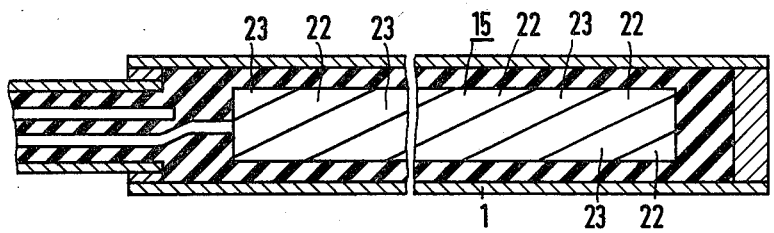
Fig.3
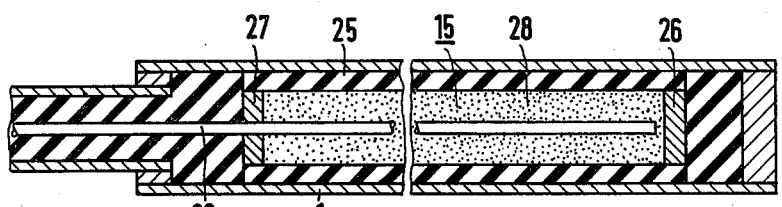
Fig.5

NEUTRON DETECTOR

BACKGROUND OF THE INVENTION

In the operation of nuclear reactors of the pressurized water-coolant type, it is desirable to monitor the neutron flux in the reactor's core. Particularly when the reactor is operating at full power, there is a relatively high gamma ray background in the core.

To detect or sense the neutron intensity in the core, it is possible to use a neutron detector comprising a tubular metal casing enclosing a neutron sensitive material emitter and refractory electrical insulating material between the collector and emitter, the neutron flux field causing the emitter to emit electrons collected by the collector, electrically conductive wires connecting the two elements to an electrical measuring device calibrated to provide the desired reading.

However, suitable electron sensitive materials are also sensitive to the gamma ray background, the output of the detector therefore representing both the neutron flux density and the gamma ray background, this being undesirable.

SUMMARY OF THE INVENTION

One of the objects of the present invention is to produce a neutron detector which can be used in the core of a pressurized water-coolant nuclear reactor and which compensates for the gamma sensitivity inherent to prior art neutron detectors.

According to the invention, the detector is made with an emitter comprising two materials of differing gamma sensitivity and of which one or both is neutron sensitive. The quantity and arrangement of these emitter materials relative to the collector is such as to compensate for the gamma sensitivity involved. The materials can be selected so that the compensation is obtained at relatively low cost. The invention provides for two embodiments of this general principle, as described hereinafter. The emitter may use more than the two different materials providing at least two of the materials for the compensation described.

In a first embodiment the emitter material, which is both neutron and gamma sensitive, has added to it a gamma sensitive material which is practically insensitive to neutron flux, the emitter then having two parts which are combined with a mutually common collector to form a single detector providing the desired compensation. This provides an additional advantage in that it is possible to eliminate any interfering electrical current which might be caused by the activation of the electrical insulating material, such as, for example, the aluminum in an aluminum oxide insulating material. The two materials preferably should have the same atomic number, because if otherwise, the masses or volume of the two materials must be proportioned unequally in the ratio of the differing atomic numbers of the two materials, to obtain the desired gamma compensation.

In one practical example of this concept, the two emitter materials can be made into elongated, attenuated shapes, such as wires or rods, arranged within the insulation parallel to each other and enclosed by a cylindrical collector. In the case of such a two-part emitter, the two parts being of the differing materials, the necessary electric circuit connections may be made to the collector and the two emitter parts, the detector having two outputs which may be fed to an electric operational amplifier of the differential type providing for the desired compensation.

In a second embodiment of the invention, both of the emitter materials may be gamma sensitive but with their respective sensitivities having opposite polarity with respect to the collector, the two materials being assembled and formed into a single emitter. In this case only a single electric output is provided by the detector so that no processing of the output is required for the gamma compensation, the output current being already gamma compensating and corresponding to the neutron flux being detected.

In this second embodiment the two materials are preferably distributed uniformly over all throughout the volume of the single emitter. The two materials can be arranged in the form of sections of a rod extending along the axis of the collector, the latter being cylindrical or tubular. In this case the sections may be arranged alternately one after the other, but a more uniform distribution of the two components can be obtained by making two components in the form of wires or strands which are helically intertwisted together, and in this case a very uniform distribution can be obtained by using very fine wires.

It is also possible to use the two materials in powder form with the powder particles of the two materials thoroughly intermixed and contained in an electrically insulating tube which provides not only a container for the powder but also the electrical insulation required between the emitter and collector, the latter also being preferably cylindrical in this instance. A wire can be run through the powder to provide the electrical circuit connection required, or the interior of the insulating tube may be metal coated to provide for an electrical contact.

BRIEF DESCRIPTION OF THE DRAWINGS

Various preferred embodiments of the invention are illustrated by the accompanying drawings, the various figures being as follows:

FIG. 1 is a longitudinal section of a first embodiment of the invention;

FIG. 1a is a cross section taken through FIG. 1;

FIG. 2 is like FIG. 1 but shows a second embodiment of the invention;

FIG. 3 is like FIG. 1 but shows a third embodiment of the invention;

FIG. 5 is like FIG. 1 but shows a fourth embodiment of the invention.

DESCRIPTION OF THE PREFERRED EMBODIMENTS

Figure 4:
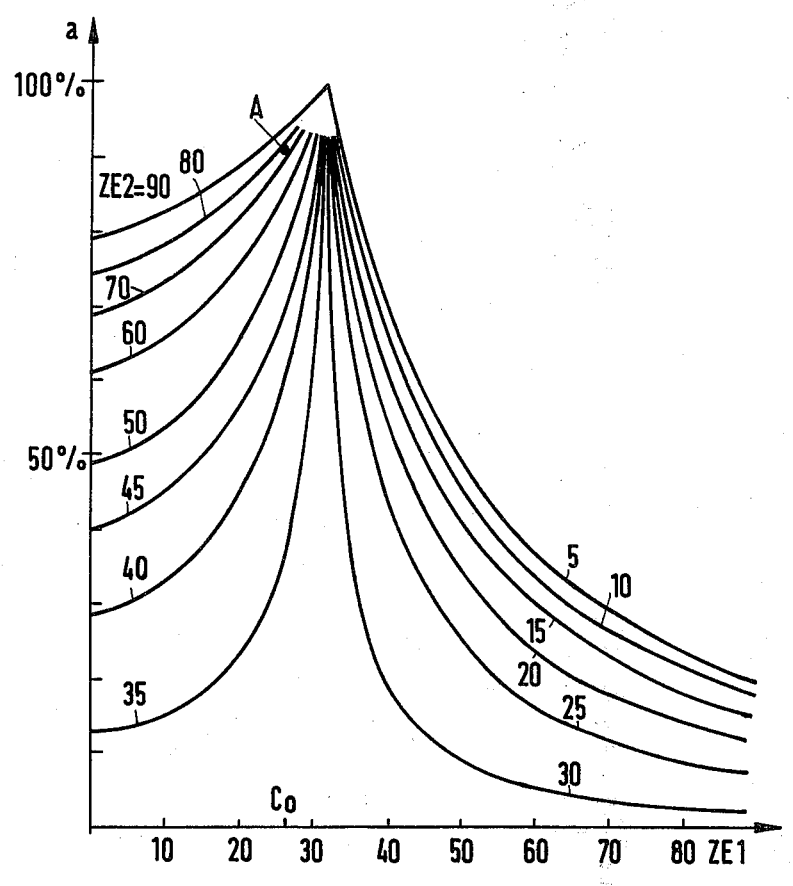
FIG. 4 graphically shows the possibilities of different emitter materials.

Referring to FIG. 1, which is on an approximately ten-times magnified scale, a self-powered neutron detector is shown as comprising a cylindrical collector 1 with the two emitter parts 2 and 3. Incidentally, the length of the detector is about 100 times the diameter or more.

The emitter parts 2 and 3 are kept at a uniform spacing from each other and from the collector 1, by electrical insulating material 5. One end of the collector 1 is closed off by a circular metallic disc 6, into which the jacket 7 of a ceramic-insulated metal shielded cable is tightly inserted. The cable provides two wires 8 and 9, which are separated from each other by the same insulating material 10 as the insulating material 5, and which connect with the parts 3 and 2, respectively. The opposite end face of the collector is closed tightly by a metallic disc 12.

The collector 1 consists of a neutron-insensitive material, e.g., a nickel alloy or a stainless steel. For the gamma-sensitive emitter part 2 a nickel alloy, for instance Inconel, is also used. The neutron and gamma sensitive emitter part 3 may consist of a material which has approximately the same atomic number as the emitter 2. If Inconel is used as the emitter part 2, cobalt or vanadium, for instance, can be used for the emitter part 3. In view of the high temperatures, the insulating materials 5 and 10 are advantageously a ceramic material, as the neutron detector according to the invention is used particularly for the core instrumentation of pressurized-water reactors.

The example of the embodiment shown in FIG. 2 has a composite emitter 15, which consists of two components with a distribution as uniform as possible. The parts are cylindrical bodies with projections 16, which engage in drill holes 17 of the adjoining part, and are joined to each other in an electrically conducting manner, for instance, by hard-soldering. Similar parts 20 alternate here with parts 19, the materials of which result, in cooperation with the collector, in gamma sensitivities of different polarity. For the parts 19, tantalum, zirconium or platinum can be used. The corresponding material for the parts 20 is preferably cobalt. For the alternating parts, vanadium-rhodium is also highly suited as a combination.

In FIG. 3 the two components are made in the form of stranded wire of the materials 22 and 23, which are twisted helically with each other. For the materials 22 and 23 applies what has been said regarding the parts 19 and 20 of FIG. 2.

FIG. 4 shows a diagram, which illustrates the possibilities of compositions for the emitter. On the abscissa the atomic number ZE 1 of the emitter material No. 1 is given, and on the ordinate the percentage of the corresponding emitter material No. 2 for optimum gamma compensation, for which a family of curves with definite atomic numbers ZE 2 are shown. If one takes cobalt, for instance, as material No. 1 with the atomic number 27, and platinum as material No. 2 with the atomic number 78, one obtains the percentage of the platinum at the point A as about 7%. This diagram is based on dimensions of the detector, also shown in FIGS. 2 and 3, where the emitter has a diamter of 2 mm, the collector a wall thickness of 1/4 mm and the insulator a thickness of 0.5 mm. Inconel 600 was the material for the collector. For other dimensions of the cross section, for instance, different thickness of the collector or the insulator, the family of curves shifts.

In FIG. 5 is shown an embodiment in which a tube of insulating material 25, which is terminated at both ends by insulating plugs 26 and 27, contains a mixture 28 of the two materials in powder particle form. This powder filling constitutes the emitter 15. As the electric connection, a central wire 30 is placed in the mixture 28, which leads to the outside through the plug 27. Alternatively, the connection can be established by making contact with an internal metal coating of the insulating tube 25.

What is claimed is:

1. A self-powered neutron flux detector for use in the presence of gamma radiation and including a neutron-sensitive emitter material which is also sensitive to gamma radiation and which is surrounded by a collector with electrical insulating material between the emitter material and collector; wherein the improvement comprises the addition to said emitter material of at least one other emitter material having a gamma sensitivity differing from that of the first-named material, said two materials being mutually proportioned and arranged to at least reduce the effect of the gamma sensitivity of the first-named material on the output of the detector, and electric circuit connections connecting with said collector and materials.

2. The detector of claim 1 in which said added material is substantially insensitive to neutron flux.

3. The detector of claim 2 in which both said materials have substantially the same atomic numbers.

4. The detector of claim 3 in which said materials are in the form of elongated attenuated shapes arranged parallel to each other and said collector is cylindrical and extends longitudinally with respect to said shapes, said connections connecting individually with said collector and each of said shapes to permit connections with the input of an electric differential amplifier.

5. The detector of claim 1 in which said materials are electrically and mechanically interconnected and said added material is of opposite polarity with respect to the first-named material.

6. The detector of claim 5 in which said materials form an emitter unit throughout which the two respective materials are uniformly distributed.

7. The detector of claim 6 in which said emitter unit is in the form of a rod formed by sections of said materials and said collector is substantially cylindrical and surrounds said rod substantially coaxially therewith.

8. The detector of claim 6 in which said materials are respectively formed as strands which are helically intertwisted to form an elongated shape and said collector is substantially cylindrical and surrounds said shape substantially coaxially therewith.

9. The detector of claim 6 in which said materials are in the form of powder particles which are intermixed and enclosed by an electrically insulating tube.

10. The detector of claim 9 in which said electrical connections include an electrically conductive strand extending through said intermixed particles in said tube.

* * * * *